United States Patent
Hang et al.

(10) Patent No.: US 9,548,658 B2
(45) Date of Patent: Jan. 17, 2017

(54) CONTROL CIRCUIT, SWITCHING POWER SUPPLY AND CONTROL METHOD

(71) Applicant: Silergy Semiconductor Technology (Hangzhou) LTD, Hangzhou, ZheJiang Province (CN)

(72) Inventors: Kailang Hang, Hangzhou (CN); Jiubing Luo, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 30 days.

(21) Appl. No.: 14/746,110

(22) Filed: Jun. 22, 2015

(65) Prior Publication Data

US 2016/0006352 A1   Jan. 7, 2016

(30) Foreign Application Priority Data

Jul. 7, 2014   (CN) .......................... 2014 1 0321006

(51) Int. Cl.
| | | |
|---|---|---|
| *H02M 3/157* | (2006.01) | |
| *H02M 3/158* | (2006.01) | |
| *H02M 1/00* | (2006.01) | |
| *H02M 3/156* | (2006.01) | |

(52) U.S. Cl.
CPC ..... *H02M 3/158* (2013.01); *H02M 2001/0025* (2013.01); *H02M 2003/1566* (2013.01)

(58) Field of Classification Search
CPC ...... H02M 3/156; H02M 3/155; H02M 3/157; H02M 3/158
USPC ................. 323/282–285, 288, 351
See application file for complete search history.

(56) References Cited

U.S. PATENT DOCUMENTS

| | | | |
|---|---|---|---|
| 8,873,206 B2 | 10/2014 | Lee et al. | |
| 9,215,772 B2 * | 12/2015 | Sood ........................ | H02M 7/04 |
| 9,332,614 B2 * | 5/2016 | Vaughan .............. | H05B 33/089 |
| 9,408,261 B2 * | 8/2016 | Angeles ............. | H05B 33/0815 |
| 2005/0017703 A1 | 1/2005 | Walters et al. | |
| 2007/0279820 A1 * | 12/2007 | Fang ..................... | H02H 7/1203 361/97 |
| 2012/0212204 A1 * | 8/2012 | Philbrick .............. | H02M 3/156 323/284 |
| 2012/0319610 A1 * | 12/2012 | Yoshinaga ......... | H05B 33/0848 315/210 |
| 2013/0154495 A1 * | 6/2013 | He ......................... | H02M 1/44 315/210 |
| 2014/0071714 A1 | 3/2014 | Li | |

(Continued)

FOREIGN PATENT DOCUMENTS

| | | |
|---|---|---|
| CN | 2744056 Y | 11/2005 |
| CN | 102904445 A | 1/2013 |

*Primary Examiner* — Adolf Berhane (74) *Attorney, Agent, or Firm* — Michael C. Stephens, Jr.

(57) ABSTRACT

A control circuit configured to control a switch-type converter, can include: (i) a state detect circuit configured to generate an error amplifying signal according to a feedback voltage and a reference voltage, to compensate the error amplifying signal by a ramp compensation signal having a predetermined frequency, and to generate a state signal by comparing the compensated error amplifying signal against a voltage ripple signal, where the voltage ripple signal changes along with an inductor current of the switch-type converter; and (ii) a control signal generator configured to generate control signals to control the switch-type converter according to the state signal.

15 Claims, 9 Drawing Sheets

(56) References Cited

U.S. PATENT DOCUMENTS

| | | |
|---|---|---|
| 2014/0139196 A1 | 5/2014 | Chen |
| 2015/0077072 A1 | 3/2015 | Yu et al. |
| 2016/0081151 A1* | 3/2016 | Wang ................. H05B 33/0815 |
| | | 315/186 |
| 2016/0095174 A1* | 3/2016 | Vaughan ............... H05B 33/089 |
| | | 315/200 R |
| 2016/0134189 A1* | 5/2016 | Pregitzer ............... H02M 3/157 |
| | | 323/283 |
| 2016/0164410 A1* | 6/2016 | Vladan ............... H02M 3/1588 |
| | | 323/271 |

* cited by examiner

CONTROL CIRCUIT, SWITCHING POWER SUPPLY AND CONTROL METHOD

RELATED APPLICATIONS

This application claims the benefit of Chinese Patent Application No. 201410321006.9, filed on Jul. 7, 2014, which is incorporated herein by reference in its entirety.

FIELD OF THE INVENTION

The present disclosure relates the field of power electronics, and in particular to control circuits, switching power supplies, and associated control methods.

BACKGROUND

A switching power supply may typically include a power stage circuit and a control circuit. The control circuit can be used to regulate on and off times of a power switch in a switch-type converter based on variations of an input voltage, various internal parameters, and a load, so as to maintain an output voltage or an output current of the switching power supply as substantially constant. Therefore, control approaches are very important to the design of a switching power supply, and may affect the performance thereof. Different power supply results may be achieved with different detection signals and/or different control circuits.

SUMMARY

In one embodiment, a control circuit configured to control a switch-type converter, can include: (i) a state detect circuit configured to generate an error amplifying signal according to a feedback voltage and a reference voltage, to compensate the error amplifying signal by a ramp compensation signal having a predetermined frequency, and to generate a state signal by comparing the compensated error amplifying signal against a voltage ripple signal, where the voltage ripple signal changes along with an inductor current of the switch-type converter; and (ii) a control signal generator configured to generate control signals to control the switch-type converter according to the state signal.

In one embodiment, a method of controlling a switch-type converter, can include: (i) generating an error amplifying signal according to a feedback voltage and a reference voltage; (ii) compensating the error amplifying signal by a ramp compensation signal having a predetermined frequency; (iii) generating a state signal by comparing the compensated error amplifying signal against a voltage ripple signal, where the voltage ripple signal changes along with an inductor current of the switch-type converter; and (iv) generating control signals for controlling the switch-type converter according to the state signal.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A power stage circuit can be implemented by a switch-type converter. Typically, the control circuit for controlling the switch-type converter may generally control frequency by controlling on time, as well as the output voltage, at the same time. However, because errors may be generated during the calculation of the on time, different loads may result in different duty cycles in the switch-type converter in the cases of different inputs and outputs. Thus, it may be difficult to obtain precise switching cycle and frequency control with some control circuits. As described herein, a power switch may refer to a switching device (e.g., a power transistor) in a switching power supply or a switch-type converter that activates an energy storage element (e.g., an inductor) to store energy when the power switch is on, and to increase current flowing through the energy storage element.

In one embodiment, a control circuit configured to control a switch-type converter, can include: (i) a state detect circuit configured to generate an error amplifying signal according to a feedback voltage and a reference voltage, to compensate the error amplifying signal by a ramp compensation signal having a predetermined frequency, and to generate a state signal by comparing the compensated error amplifying signal against a voltage ripple signal, where the voltage ripple signal changes along with an inductor current of the switch-type converter; and (ii) a control signal generator configured to generate control signals to control the switch-type converter according to the state signal.

Figure 1:
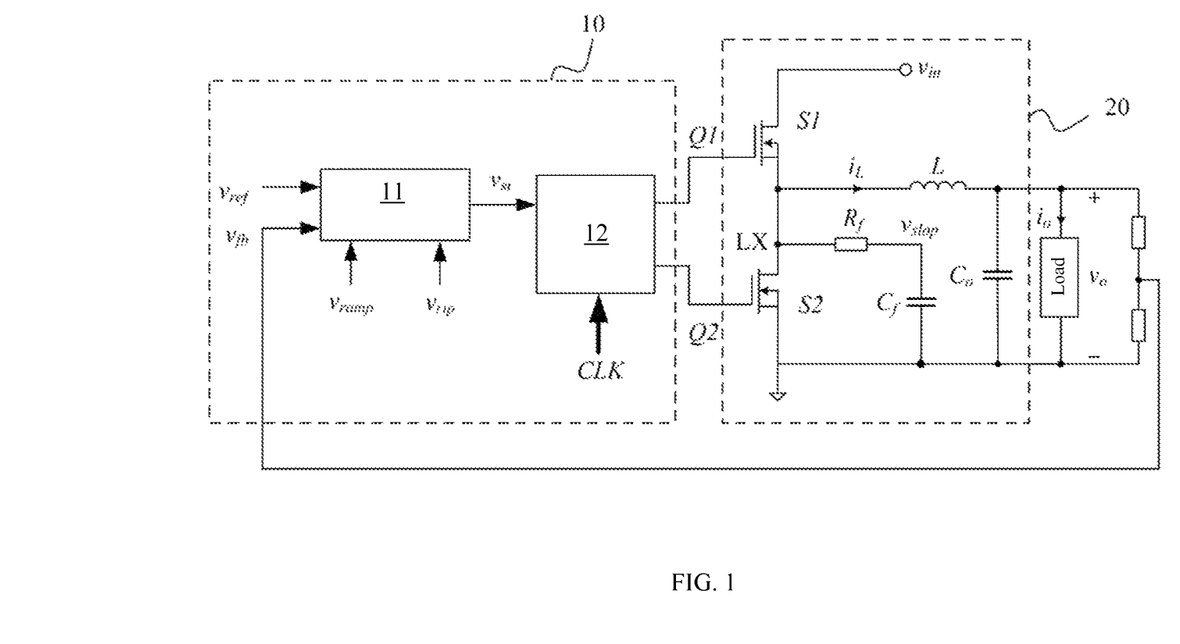
FIG. 1 is a schematic block diagram of a first example switching power supply, in accordance with embodiments of the present invention.

Referring now to FIG. 1, shown is a schematic block diagram of a first example switching power supply, in accordance with embodiments of the present invention. In this particular example, a switching power supply can include control circuit 10 and switch-type converter 20. Switch-type converter 20 can be a buck topology, and may include power switch S1, power switch S2, inductor L, and output capacitance $C_o$, whereby inductor L is an energy storage element. Power switch S1 can connect between input voltage source $V_{in}$ and junction LX, and power switch S2 can connect between junction LX and ground. Power switches S1 and S2 can be separately turned on and off by corresponding control signals Q1 and Q2 that are generated by control circuit 10. In this way, switch-type converter 20 may generate substantially constant output voltage $V_o$.

In this particular example, power switches S1 and S2 can be turned on/off in complementary fashion such that power switch S2 is off when power switch S1 is on, and power switch S2 is on when power switch S1 is off. In one example implementation control signals Q1 and Q2 can be complementary in operation. For example, power switches S1 and S2 can be NMOS power transistors. One skilled in the art will recognize that the power switches can alternatively employ any controllable semiconductor switch, such as a metal oxide semiconductor field effect transistor (MOSFET), bipolar junction transistor (BJT), or any other suitable switching device.

Feedback voltage $V_{fb}$ can be obtained by dividing output voltage $V_o$ through a bleeder circuit, and may be provided to control circuit 10. Control circuit 10 can generate control signals Q1 and Q2 based on feedback voltage $V_{fb}$. Control circuit 10 can include state detect circuit 11 and control signal generator 12. State detect circuit 11 may be used to generate error amplifying signal $V_e$ according to feedback voltage $V_{fb}$ and reference voltage $V_{ref}$. Ramp compensation signal $V_{ramp}$ with a predetermined frequency may be used to compensate error amplifying signal $V_e$ in order to produce error amplifying signal $V_c$. State signal $V_{st}$ can be generated by comparing error amplifying signal $V_c$ against voltage ripple $V_{rip}$. For example, voltage ripple $V_{rip}$ may change along with inductor current $i_L$ of switch-type converter 20 (e.g., voltage ripple $V_{rip}$ rises when inductor current $i_L$ rises, and decreases when inductor current $i_L$ decreases).

Voltage ripple $V_{rip}$ can be generated by a controlled voltage source that is controlled by inductor current $i_L$, and including other relevant parameters. For example, ripple sense resistor $R_f$ and ripple sense capacitor $C_f$ can connect in series between junction LX and ground, and the controlled voltage source can generate voltage ripple $V_{rip}$ based on a voltage across ripple sense capacitor $C_f$. Those skilled in the art will recognize that voltage ripple $V_{rip}$ can alternatively be generated in other appropriate ways.

Control signal generator 12 can generate control signals Q1 and Q2 for controlling switch-type converter 20 according to state signal $V_{st}$, where control signals Q1 and Q2 have a predetermined frequency in a stable state. For example, control signal generator 12 can generate control signals Q1 and Q2 according to state signal $V_{st}$ and clock signal CLK with a predetermined frequency. In some cases, clock signal CLK and ramp compensation signal $V_{ramp}$ may have the same predetermined frequency. For example, control signal generator 12 can switch control signals Q1 and Q2 from a first state (e.g., Q1 on, Q2 off) to a second state (e.g., Q1 off, Q2 on) according to state signal $V_{st}$, and from the second state to the first state according to clock signal CLK. When state signal $V_{st}$ transitions from low to high, control signal generator 12 can transition control signal Q1 from indicating an on state (e.g., high) to indicating an off state (e.g., low), and control signal Q2 from indicating an off state (e.g., low) to indicating an on state (e.g., high). Also, when a clock pulse of clock signal CLK with a predetermined frequency is activated, control signal generator 12 can transition control signals Q1 and Q2 from the second state to the first state.

For example, control signal generator 12 can generate control signals Q1 and Q2 in the first state (e.g., Q1 on, Q2 off) when state signal $V_{st}$ is at a high level, and control signals Q1 and Q2 in the second state (e.g., Q1 off, Q2 on) when state signal $V_{st}$ is at a low level. In this particular example, ramp compensation signal $V_{ramp}$ may be a periodic signal with a fixed frequency. Thus, when ramp compensation signal $V_{ramp}$ periodically reaches a max value that is greater than voltage ripple $V_{rip}$, the level of state signal $V_{st}$ can transition, and in the stable state, control signals Q1 and Q2 may have a predetermined frequency.

Figure 2:
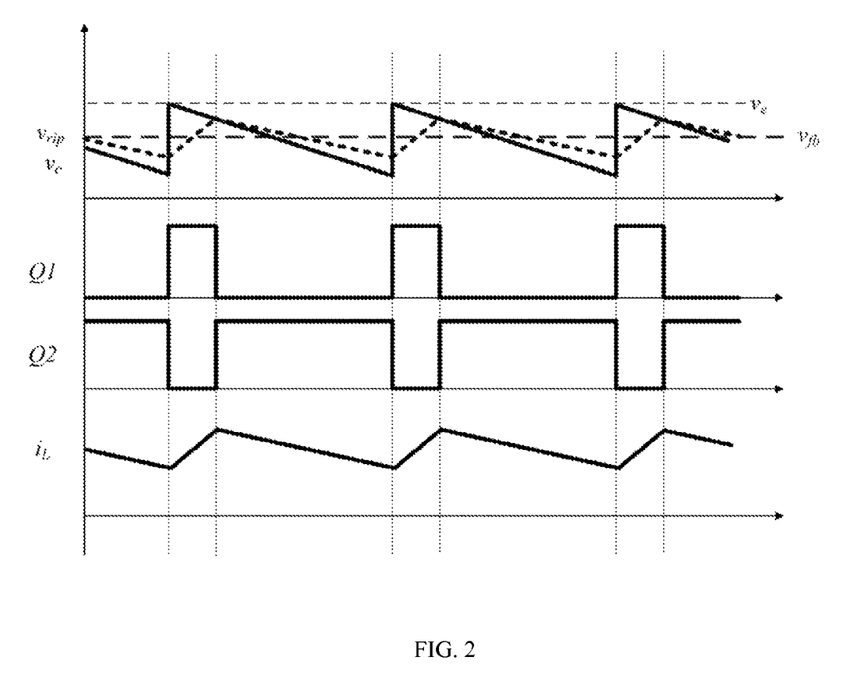
FIG. 2 is a waveform diagram of example operation of the switching power supply of FIG. 1, in accordance with embodiments of the present invention.

Referring now to FIG. 2, shown is a waveform diagram of example operation of the switching power supply of FIG. 1, in accordance with embodiments of the present invention. As shown, voltage ripple $V_{rip}$ may change along with inductor current $i_L$ of switch-type converter 20. When voltage ripple $V_{rip}$ rises to be greater than error amplifying signal $V_c$, state signal $V_{st}$ can transition in order to change the states of control signals Q1 and Q2. Thus, inductor current $i_L$ may start to decrease. Before the predetermined period arrives, voltage ripple $V_{rip}$ may begin to be less than error amplifying signal $V_c$, and state signal $V_{st}$ can again transition to switch the states of control signals Q1 and Q2. Alternatively, clock signal CLK can trigger the states of control signals Q1 and Q2 to change, such that inductor $i_L$ again begins to rise. In this way, switch-type converter 20 can output substantial output voltage $V_o$. Also, the voltage ripple that changes along with the inductor current of the switch-type converter can be taken as a reference to achieve fixed frequency control, so as to improve the control precision of the switch-type converter, and to obtain high frequency control.

Figure 3:
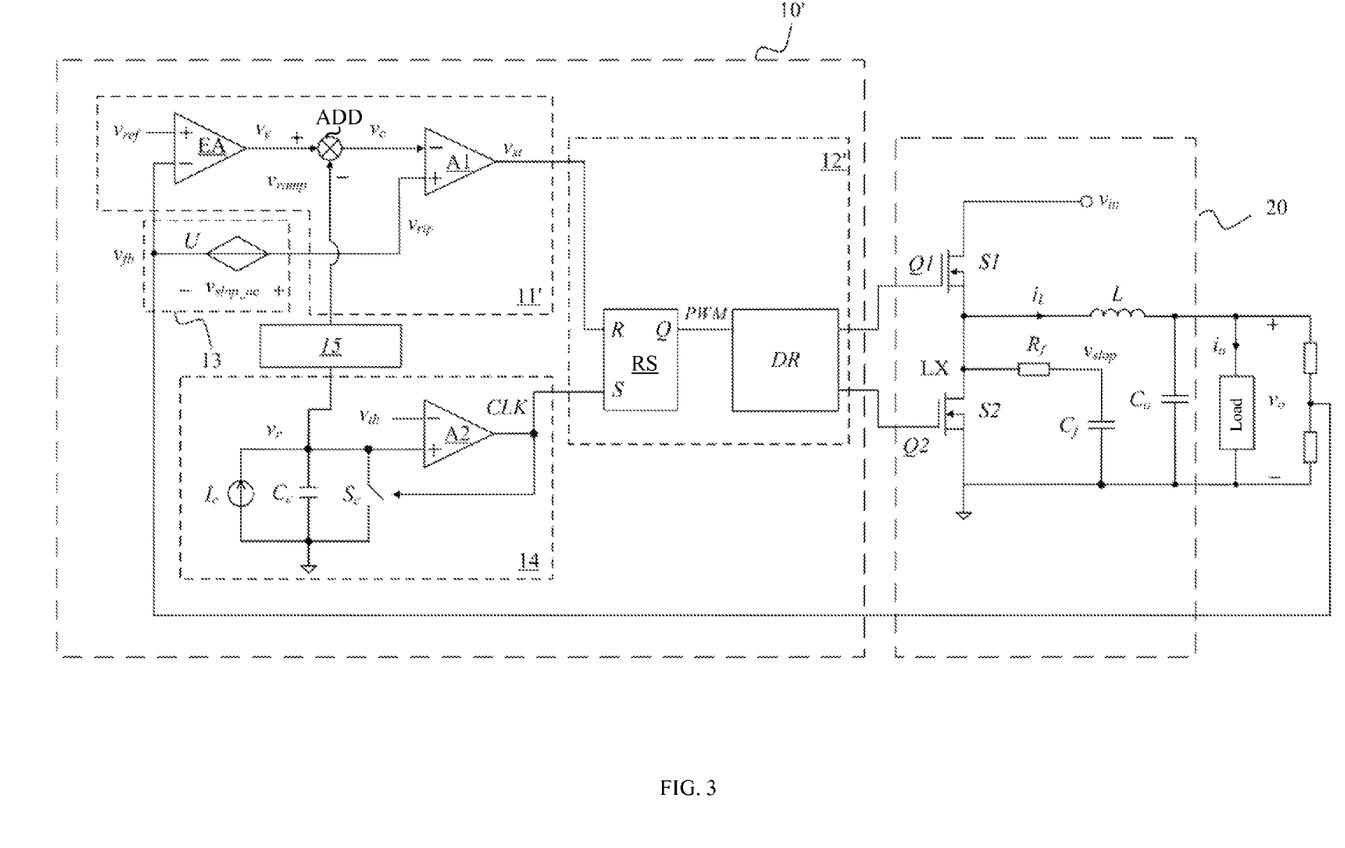
FIG. 3 is a schematic block diagram of a second example switching power supply, in accordance with embodiments of the present invention.

Referring now to FIG. 3, shown is a schematic block diagram of a second example switching power supply, in accordance with embodiments of the present invention. In this particular example, a switching power supply can include control circuit 10' and switch-type converter 20. Control circuit 10' can include state detect circuit 11' and control signal generator 12'. State detect circuit 11' can generate error amplifying signal $V_e$ according to feedback voltage $V_{fb}$ and reference voltage $V_{ref}$. Ramp compensation signal $V_{ramp}$ with a predetermined frequency may compensate error amplifying signal $V_e$ in order to produce error amplifying signal $V_c$. State signal $V_{st}$ can be generated by comparing error amplifying signal $V_c$ against voltage ripple $V_{rip}$.

For example, voltage ripple $V_{rip}$ may change along with inductor current $i_L$ of switch-type converter 20, and state detect circuit 11' can include error amplifier EA, adder ADD, and comparator A1. Error amplifier EA can generate error amplifying signal $V_e$ according to feedback voltage $V_{fb}$ and reference voltage $V_{ref}$. For example, feedback voltage $V_{fb}$ may be a voltage obtained by dividing output voltage $V_o$ of switch-type converter 20 through a bleeder circuit, which can be used to represent the output state of the switch-type converter.

Adder "ADD" can compensate error amplifying signal $V_e$ with ramp compensation signal $V_{ramp}$. Adder ADD may add ramp compensation signal $V_{ramp}$ with error amplifying signal $V_e$, or may subtract ramp compensation signal $V_{ramp}$ from error amplifying signal $V_e$. It can be determined by the ramp compensation signal whether to add or subtract. For example, if ramp compensation signal $V_{ramp}$ is a sawtooth type of signal that transitions to zero after linearly rising from zero to a predetermined value, ramp compensation signal $V_{ramp}$ may be subtracted from error amplifying signal $V_e$. However, if ramp compensation signal $V_{ramp}$ is a signal that linearly decreases after transitioning to the predetermined value from zero, ramp compensation signal $V_{ramp}$ may be added with error amplifying signal $V_e$ in order to achieve slope compensation. Error amplifying signal $V_e$ may be a signal that changes relatively slowly, and error amplifying signal $V_c$ can change simultaneously with the period of ramp compensation signal $V_{ramp}$, and can be obtained by adding to or being subtracted by ramp compensation signal $V_{ramp}$.

Ramp compensation signal $V_{ramp}$ can be generated by a dedicated circuit, or may be obtained by processing a ramp signal generated by another circuit in control circuit 10'. In one example, ramp compensation signal $V_{ramp}$ can be generated by a circuit that is also used to generate clock signal CLK. Comparator A1 can compare error amplifying signal $V_c$ against voltage ripple $V_{rip}$ in order to generate state signal $V_{st}$. Voltage ripple $V_{rip}$ may represent a state of the inductor current of the switch-type converter. Therefore, state signal $V_{st}$ can be obtained by comparing error amplifying signal $V_c$ against voltage ripple signal $V_{rip}$, and state signal $V_{st}$ can determine if the state of switch-type converter 20 should be adjusted.

In one example, voltage ripple $V_{rip}$ may be generated by voltage ripple generator 13. Voltage ripple generator 13 can obtain voltage ripple $V_{rip}$ by adding feedback voltage $V_{fb}$ with ripple signal $V_{slop\_ac}$. Ripple signal $V_{slop\_ac}$ may change along with inductor current $i_L$ of switch-type converter 20. Ripple signal $V_{slop\_ac}$ can be obtained by processing a voltage that represents inductor current $i_L$ of switch-type converter 20. For example, ripple sense resistor $R_f$ and ripple sense capacitor $C_f$ can connect in series between junction LX and ground, and voltage $V_{slop}$ across ripple sense capacitor $C_f$ may represent inductor current $i_L$. Ripple signal $V_{slop\_ac}$ can be obtained by converting voltage $V_{slop}$ to an AC voltage via subtracting DC component $V_1$ from voltage $V_{slop}$, and then by multiplying the difference by factor k1 (e.g., $V_{slop\_ac}=k1(V_{slop}-V_1)$). Voltage ripple generator 13 can be implemented by controlled voltage source U that may connect between feedback voltage input terminal $V_{fb}$ and an input terminal of comparator A1. The voltage of controlled voltage source U can equal the voltage value of ripple signal $V_{slop\_ac}$, and controlled voltage source U may be controlled by voltage $V_{slop}$.

Control signal generator 12' can generate control signals Q1 and Q2 according to state signal $V_{st}$ and clock signal CLK (e.g., with a predetermined frequency). For example, clock signal CLK and ramp compensation signal $V_{ramp}$ have the same predetermined frequency. Control signal generator 12' can switch control signals Q1 and Q2 from the first state to the second state according to state signal $V_{st}$, and switch control signals Q1 and Q2 from the second state to the first state according to clock signal CLK. For example, when state signal $V_{st}$ changes from low to high, control signal generator 12' can switch control signal Q1 from indicating an on state (e.g., high) to indicating an off state (e.g., low), and may switch control signal Q2 from indicating an off state (e.g., low) to indicating an on state (e.g., high). That is, control signals Q1 and Q2 may be switched from the first state (e.g., Q1 on, Q2 off) to the second state (e.g., Q1 off, Q2 on). Further, when a pulse of clock signal CLK is generated, control signal generator 12 can switch control signals Q1 and Q2 from the second state (e.g., Q1 off, Q2 on) to the first state (e.g., Q1 on, Q2 off).

Control signal generator 12' can also include RS flip-flop "RS" and driving circuit DR. RS flip-flop RS may have a reset terminal for receiving state signal $V_{st}$, a set terminal for receiving clock signal CLK, and an output terminal for generating a pulse-width modulation (PWM) signal. Driving circuit "DR" can receive the PWM signal, and may generate control signals Q1 and Q2. Control circuit 10' can include clock signal generator 14 and ramp compensation signal generator 15. Clock signal generator 14 can include current source $I_c$, charge capacitor $C_c$, discharge switch $S_c$, and comparator A2. Current source $I_c$, charge capacitor $C_c$, and discharge switch $S_c$ can connect in parallel between a non-inverting input terminal of comparator A2 and ground. An inverting input terminal of comparator A2 can receive threshold voltage $V_{th}$, and an output terminal may provide clock signal CLK.

Discharge switch $S_c$ can be turned on and off by clock signal CLK. When discharge switch $S_c$ is off, current source $I_c$ may charge capacitor $C_c$, and a voltage across charge capacitor $C_c$ may linearly rise (e.g., with a predetermined slope). When the voltage across charge capacitor $C_c$ rises to a level of threshold voltage $V_{th}$, comparator A2 can generate a high level to turn on discharge switch $S_c$ such that the voltage across charge capacitor $C_c$ may be discharged to zero. As the voltage across charge capacitor $C_c$ is reduced to be less than threshold voltage $V_{th}$, comparator A2 may output a low level to turn off discharge switch $S_c$. Therefore, clock signal generator 14 can generate a clock signal with a predetermined frequency.

Voltage $V_r$ across charge capacitor $C_c$ in clock signal generator 14 can be used to generate ramp compensation signal $V_{ramp}$. Ramp compensation signal generator 15 can receive a voltage at the node of charge capacitor $C_c$ other than ground, and may generate ramp compensation signal $V_{ramp}$. For example, voltage $V_r$ at the node of charge capacitor Cc other than ground (e.g., at the inverting terminal of comparator A2) is a sawtooth wave that gradually rises to threshold voltage $V_{th}$, and quickly decreases to zero. For example, ramp compensation signal generator 15 can be a multiplier that multiplies the voltage at the inverting terminal of comparator A2 with a regulation factor, in order to obtain ramp compensation signal $V_{ramp}$ with a predetermined period.

Figure 4:
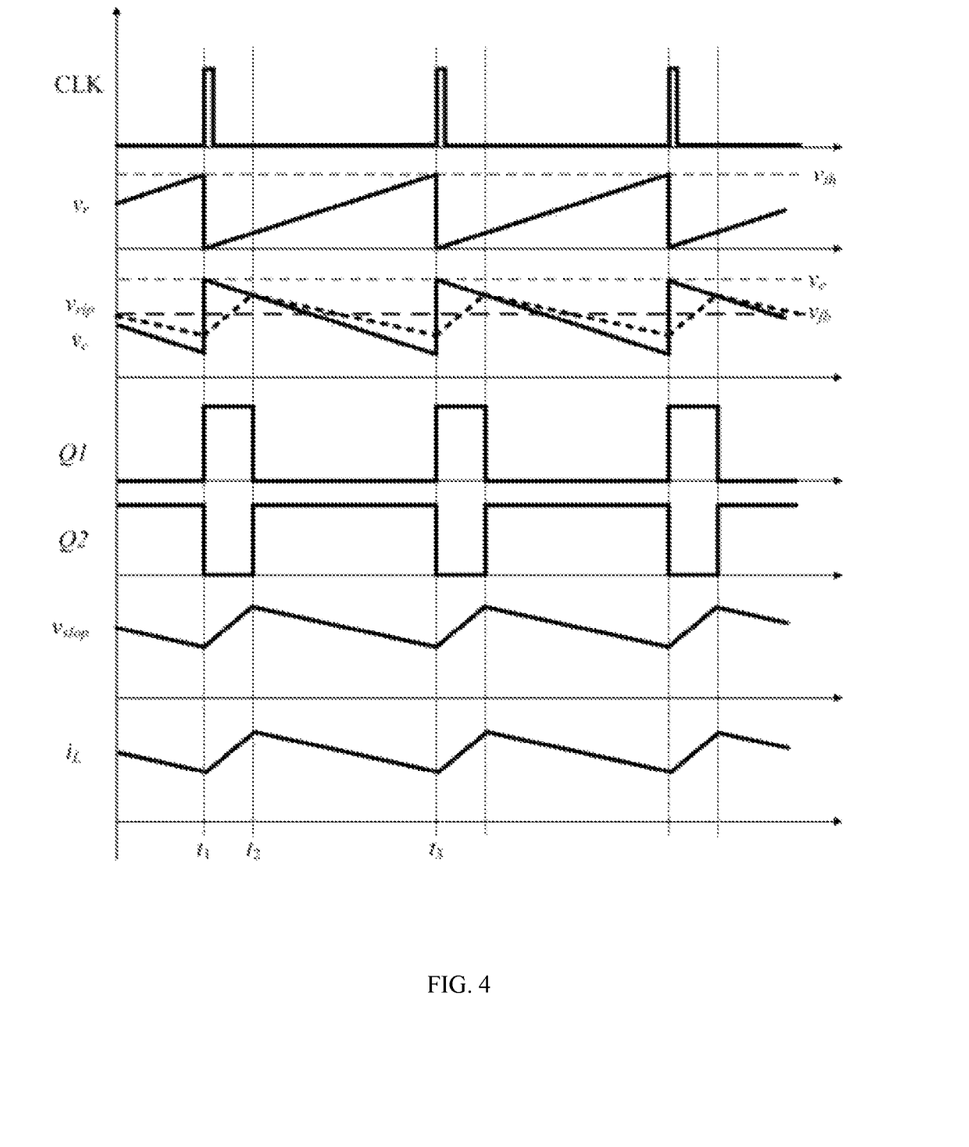
FIG. 4 is a waveform diagram of example operation of the switching power of FIG. 3 operating in a stable state, in accordance with embodiments of the present invention.

Referring now to FIG. 4, shown is a waveform diagram of example operation of the switching power of FIG. 3 operating in a stable state, in accordance with embodiments of the present invention. In this example, voltage $V_{slop}$ that changes along with the inductor current can be sampled by an RC circuit connected between junction LX and ground. Controlled voltage source U may generate voltage $V_{slop\_ac}$ based on voltage $V_{slop}$. Voltage ripple $V_{rip}$ can be obtained by adding voltage $V_{slop\_ac}$ with feedback voltage $V_{fb}$, and may be provided to comparator A1.

In addition, an error between feedback voltage $V_{fb}$ and reference voltage $V_{ref}$ may be amplified in order to generate error amplifying signal $V_e$. Error amplifying signal $V_e$ may be subtracted by or added with ramp compensation signal $V_{ramp}$ in order to obtain error amplifying signal $V_c$ by ramp compensation. At time $t_1$, when a clock pulse (e.g., rising edge) of clock signal CLK is generated, RS flip-flop RS may be set, and the PWM signal can be high, while state signal $V_{st}$ is low. Driving circuit DR may then generate complementary control signals Q1 and Q2 according to the PWM signal being high, such that Q1 may indicate on and Q2 may indicate off. Therefore, power switch S1 of switch-type converter 20 can be turned on, and power switch S2 can be turned off, and inductor current $i_L$ of inductor L may begin to rise.

In the waveforms shown in FIG. 4, when voltage ripple $V_{rip}$ rises to be greater than voltage $V_c$ (e.g., at time $t_2$), state signal $V_{st}$ can transition from low to high. Thus, RS flip-flop RS may be reset, and the PWM signal can be low, while clock signal CLK is also low. Driving circuit DR may output complementary control signals Q1 and Q2 according to the low PWM signal such that Q1 may indicate off and Q2 may indicate on. Therefore, power switch S1 of switch-type converter 20 may be turned off, and power switch S2 can be turned on. In this case, inductor current $i_L$ of inductor L can begin decreasing until the next clock pulse is generated (at time $t_3$). In this way, inductor current $i_L$ can be controlled to change in a predetermined range, and switch-type converter 20 may output substantially constant output voltage $V_o$.

Figure 5:
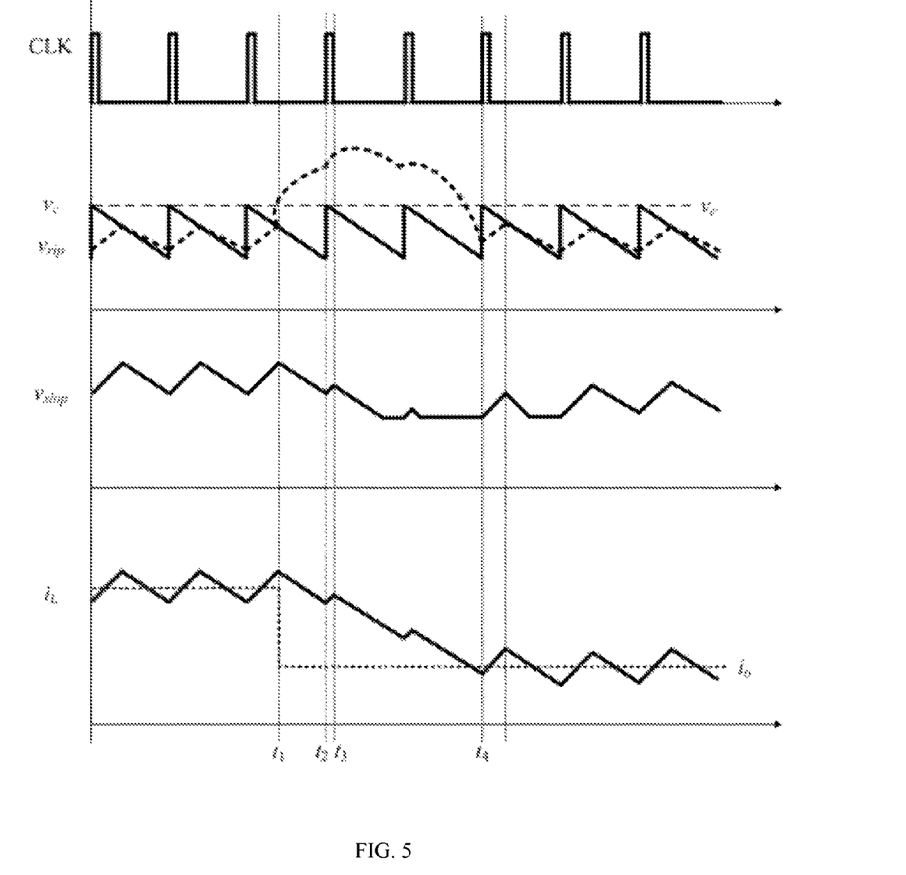
FIG. 5 is a waveform diagram of example operation of the switching power of FIG. 3 operating with a load that drops suddenly, in accordance with embodiments of the present invention.

Referring now to FIG. 5, shown is a waveform diagram of example operation of the switching power of FIG. 3 operating with a load that drops suddenly, in accordance with embodiments of the present invention. As shown in FIG. 5, when the load suddenly drops (e.g., at time $t_1$), output current $i_o$ may suddenly decrease. As a result, feedback voltage $V_{fb}$ may suddenly increase, and voltage ripple $V_{rip}$ may quickly rise to be greater than error amplifying signal $V_c$ (e.g., obtained by ramp compensation). Comparator A1 may output state signal $V_{st}$ as a high level to reset RS flip-flop RS, and RS flip-flop RS may output a low level. In this case, power switch S1 can be off, power switch S2 may be on, and inductor current $i_L$ can continuously decrease.

At time $t_2$, when the clock pulse (e.g., rising edge) of clock signal CLK is generated, state signal $V_{st}$ may remain high. Hence, both of the set and reset terminals of RS flip-flop RS can be high, but RS flip-flop RS may be set because the set terminal has a higher priority, in order to output a high level. Thus, driving circuit DR can generate control signals Q1 and Q2 to turn on power switch S1, and to turn off power switch S2. At time $t_3$, clock signal CLK may recover to a low level at the end of the clock pulse, and state signal $V_{st}$ may remain high. RS flip-flop RS can be reset to output a low level, and driving circuit DR can generate control signals Q1 and Q2 to turn off power switch S1, and to turn on power switch S2. Thus, inductor current $i_L$ may continuously decrease after rising for a relatively short time portion.

After one or two periods, at time $t_4$, inductor current $i_L$ may decrease to a value around the current output current $i_o$, such that voltage ripple $V_{rip}$ may gradually decrease to be less than error amplifying signal $V_c$. When the clock pulse is generated, RS flip-flop RS can be set to output a high level, and driving circuit DR can generate control signals Q1 and Q2 to turn on power switch S1 and to turn off power switch S2. Inductor current $i_L$ may begin to rise, state signal $V_{st}$ can be low as voltage ripple $V_{rip}$ is less than error amplifying signal $V_c$, and control signals Q1 and Q2 may remain in the state as at the end of the clock pulse, until voltage ripple $V_{rip}$ rises to be greater than error amplifying signal $V_c$. Control circuit 10' may control switch-type converter 20 to return to a stable state.

When the load suddenly changes, during the transition, power switch S1 and power switch S2 can remain on and off according to the predetermined frequency. In this example, the voltage ripple that changes along with the inductor current of the switch-type converter may be taken as a reference in order to achieve fixed frequency control. In this way the control precision of the switch-type converter can be improved, and high frequency control can be obtained.

Figure 6:
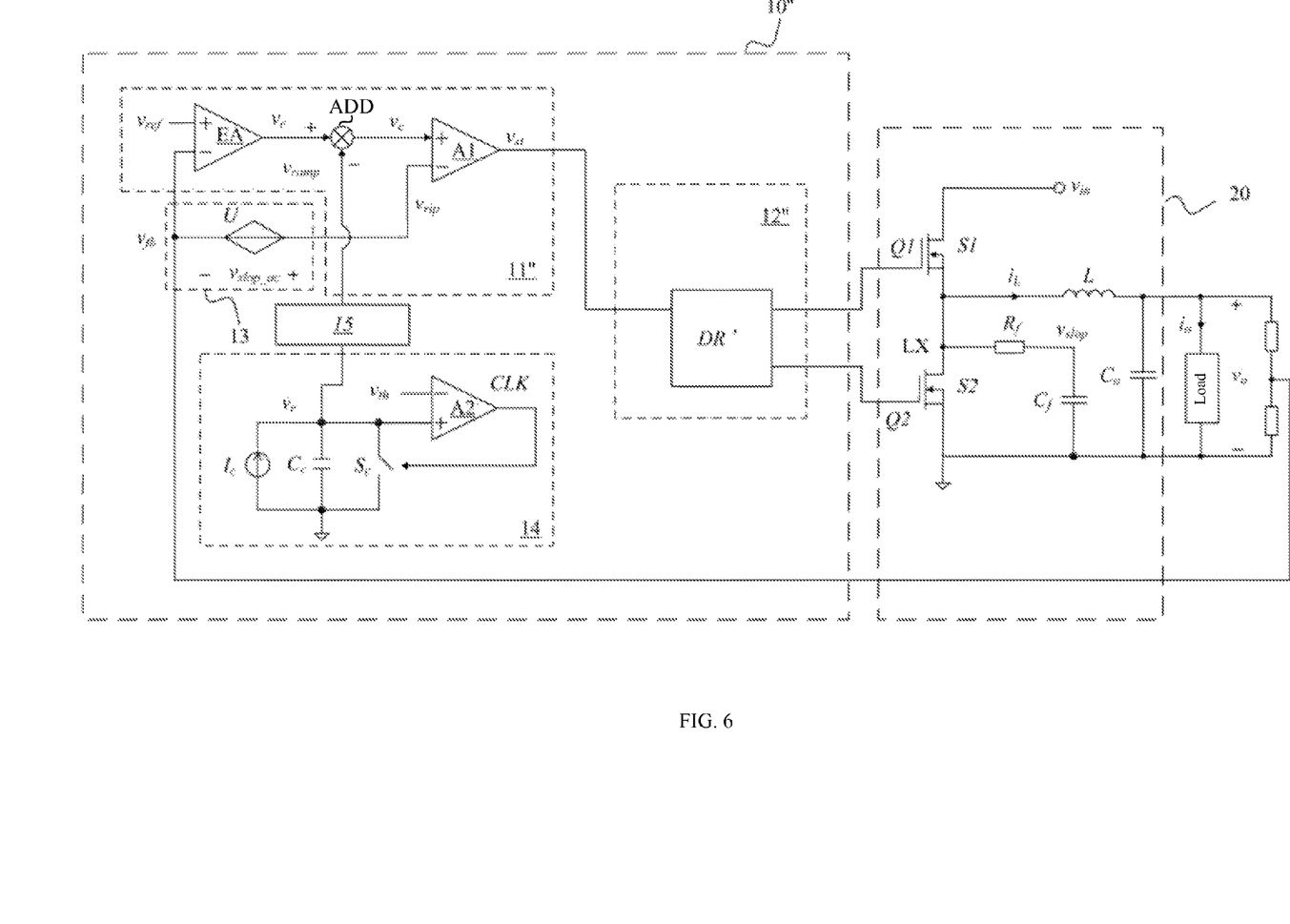
FIG. 6 is a schematic block diagram of a third example switching power supply, in accordance with embodiments of the present invention.

Referring now to FIG. 6, shown is a schematic block diagram of a third example switching power supply, in accordance with embodiments of the present invention. In this particular example, the switching power supply can include control circuit 10" and switch-type converter 20. Control circuit 10" can include state detect circuit 11" and control signal generator 12". State detect circuit 11" can generate error amplifying signal $V_e$ according to feedback voltage $V_{fb}$ and reference voltage $V_{ref}$. Ramp compensation signal $V_{ramp}$ (e.g., with a predetermined frequency) may compensate error amplifying signal $V_e$ in order to produce error amplifying signal $V_c$. State signal $V_{st}$ can be generated by comparing error amplifying signal $V_c$ against voltage ripple $V_{rip}$. State detect circuit 11" may have the same general configuration as in the above example, while in this case, the signal input to comparator A1 of state detect circuit 11" is opposite to that of the above example.

Ramp compensation signal $V_{ramp}$ used by state detect circuit 11" can be generated by clock signal generator 14 and ramp compensation signal 15, as discussed above. Also, voltage ripple $V_{rip}$ may be generated by voltage ripple generator 13, as also discussed above. In this particular example, control signal generator 12" may control signals Q1 and Q2 to be in the first state (e.g., Q1 on, Q2 off) when state signal $V_{st}$ is high, and control signals Q1 and Q2 to be in the second state (e.g., Q1 off, Q2 on) when state signal $V_{st}$ is low. Because ramp compensation signal $V_{ramp}$ may be a periodic signal with a fixed frequency, when ramp compensation signal $V_{ramp}$ periodically reaches a maximum value that is greater than voltage ripple $V_{rip}$, the level of state signal $V_{st}$ may change. Therefore, in the stable state, control signals Q1 and Q2 may have predetermined frequency. In this way, control signal generator 12" can generate control signals without using a separate clock signal. For example, control signal generator 12" can include driving circuit DR', which can generate corresponding control signals Q1 and Q2 according to state signal $V_{st}$.

Figure 7:
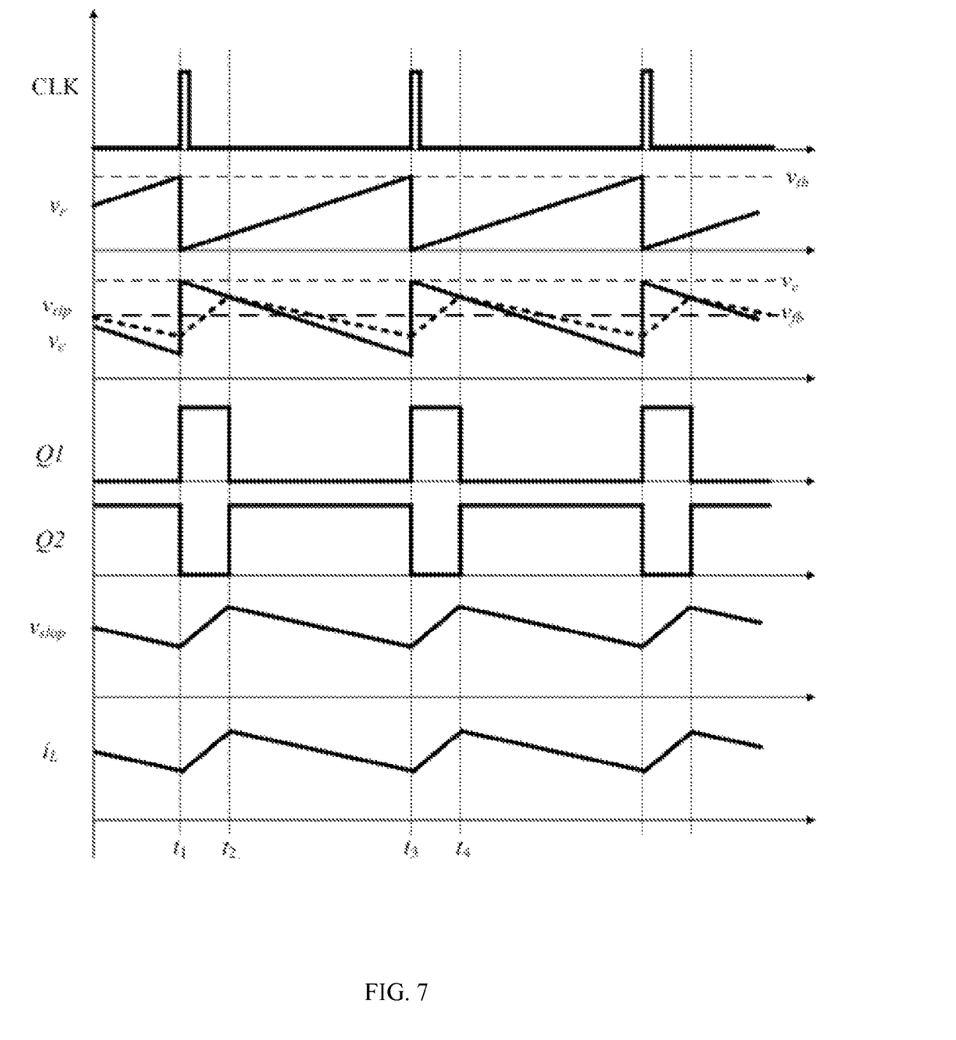
FIG. 7 is a waveform diagram of example operation of the switching power of FIG. 6 operating in a stable state, in accordance with embodiments of the present invention.

Referring now to FIG. 7, shown is a waveform diagram of example operation of the switching power of FIG. 6 operating in a stable state, in accordance with embodiments of the present invention. The waveforms of the switching power supply in this particular example are similar to FIG. 4. Voltage $V_{slop}$ can change along with the inductor current, and may be sampled by a RC circuit connected between junction LX and ground. Controlled voltage source U can generate voltage $V_{slop\_ac}$ based on voltage $V_{slop}$, and voltage ripple $V_{rip}$ may be obtained by adding voltage $V_{slop\_ac}$ with feedback voltage $V_{fb}$, and provided to comparator A1. An error between feedback voltage $V_{fb}$ and reference voltage $V_{ref}$ may be amplified in order to generate error amplifying signal $V_e$. Also, error amplifying signal $V_e$ may be subtracted by or added with ramp compensation signal $V_{ramp}$ in order to obtain error amplifying signal $V_c$ by ramp compensation.

However, in this particular example, at time $t_1$, ramp compensation signal $V_{ramp}$ (e.g., with a predetermined frequency) can transition such that error amplifying signal $V_c$ may transition to be greater than voltage ripple $V_{rip}$, and state signal $V_{st}$ can be high. Driving circuit DR' may generate complementary control signals Q1 and Q2 according to a high level state signal $V_{st}$ such that Q1 indicates on and Q2 indicates off. Therefore, power switch S1 of switch-type converter can be turned on and power switch S2 may be turned off, and thus inductor current $i_L$ of inductor L may begin to rise.

When inductor current $i_L$ is rising, error amplifying signal $V_c$ may remain greater than voltage ripple $V_{rip}$ though it is continuously decreasing in this example. State signal $V_{st}$ can remain high, and power switch S1 can remain on and power switch S2 may remain off. At time $t_2$, voltage ripple $V_{rip}$ can rise to be greater than voltage $V_c$, and state signal $V_{st}$ may transition from high to low. Driving circuit DR' can generate complementary control signals Q1 and Q2 according to a low level state signal $V_{st}$ such that Q1 indicates off and Q2 indicates on. Thus, power switch S1 of switch-type converter 20 may be turned off, and power switch S2 may be turned on, inductor current $i_L$ of inductor L may begin decreasing until transition of ramp compensation signal $V_{ramp}$ of the next period, and control signals Q1 and Q2 may have fixed frequency in the stable state.

Figure 8:
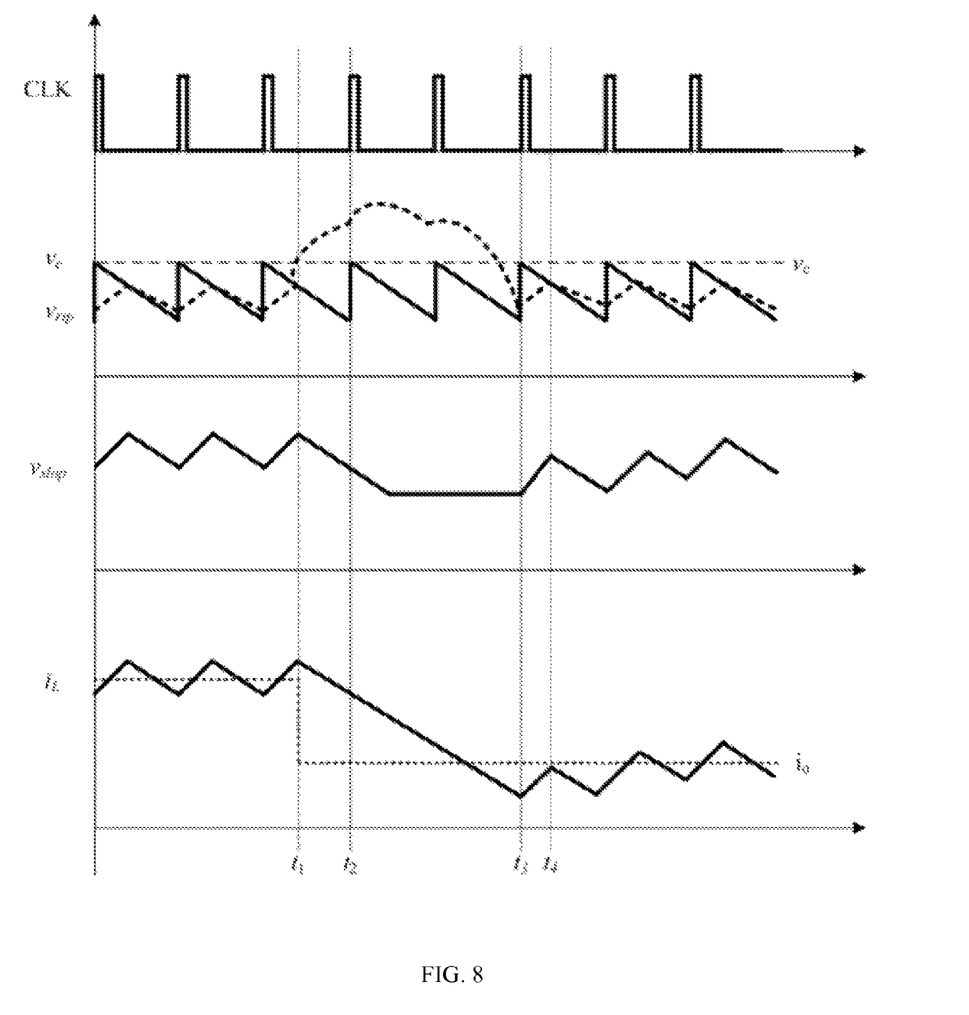
FIG. 8 is a waveform diagram of example operation of the switching power of FIG. 6 operating with a load that drops suddenly, in accordance with embodiments of the present invention.

Referring now to FIG. 8, shown is a waveform diagram of example operation of the switching power of FIG. 6 operating with a load that drops suddenly, in accordance with embodiments of the present invention. In this example, when the load suddenly drops (e.g., at time $t_1$), output current $i_o$ may suddenly decrease, and as a result, feedback voltage $V_{fb}$ may suddenly increase. Voltage ripple $V_{rip}$ can quickly rise to be greater than error amplifying signal $V_c$ (e.g., obtained by ramp compensation), and comparator A1 may output a low level state signal $V_{st}$. In this case, power switch S1 can be off, power switch S2 may be on, and inductor current $i_L$ can continuously decrease. At time $t_2$, ramp compensation signal $V_{ramp}$ and error amplifying signal $V_c$ may transition. However, error amplifying signal $V_c$ may remain less than voltage ripple $V_{rip}$ such that state signal $V_{st}$ output by comparator A1 remains low. Thus, power switch S1 can remain off, power switch S2 can remain on, and inductor current $i_L$ may continuously decrease until time $t_3$.

At time $t_3$, inductor current $i_L$ may decrease to a value around the current output current $i_o$, such that voltage ripple $V_{rip}$ may gradually decrease to be less than error amplifying signal $V_c$. After error amplifying signal $V_c$ transitions to be greater than voltage ripple $V_{rip}$, comparator A1 may output a high state signal $V_{st}$ such that power switch S1 is turned on and power switch S2 is turned off. Thus, inductor current $i_L$ may again begin to rise, and the circuit can return to a stable state. When the load suddenly transitions, and during the transition, power switch S1 and power switch S2 may not undergo one or two switching actions. In this example, control signal generator 12" may generate control signals according to state signal $V_{st}$ being high such that power switch S1 is turned on and power switch S2 is turned off.

Those skilled in the art will recognize that control signal generator 12" can alternatively output control signals according to the state signal being low such that power switch S1 is on, and power switch S2 is off, or output control signals according to the state signal being high such that power switch S1 is off and second power switch is on. For example, this can be achieved by exchanging the non-inverting input terminal of the comparator A1 of state detect circuit 11" with the inverting input terminal. In this example, the voltage ripple that changes along with the inductor current the switch-type converter may be taken as a reference in order to achieve fixed frequency control. In this way, the control precision of the switch-type converter can be improved, and high frequency control may be obtained.

In one embodiment, a method of controlling a switch-type converter, can include: (i) generating an error amplifying signal according to a feedback voltage and a reference voltage; (ii) compensating the error amplifying signal by a ramp compensation signal having a predetermined frequency; (iii) generating a state signal by comparing the compensated error amplifying signal against a voltage ripple signal, where the voltage ripple signal changes along with an inductor current of the switch-type converter; and (iv) generating control signals for controlling the switch-type converter according to the state signal.

Figure 9:
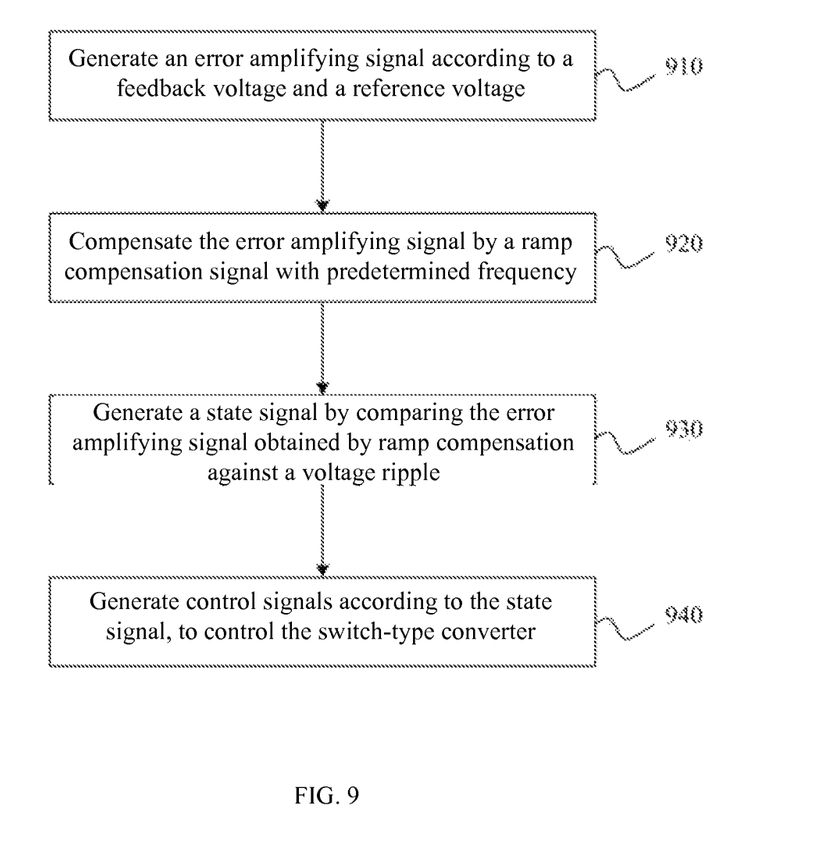
FIG. 9 is a flow diagram of an example method of controlling a switch-type converter, in accordance with embodiments of the present invention.

Referring now to FIG. 9, shown is a flow diagram of an example method of controlling a switch-type converter, in accordance with embodiments of the present invention. At step 910, an error amplifying signal (e.g., $V_e$) can be generated according to a feedback voltage (e.g., $V_{fb}$) and a reference voltage (e.g., $V_{ref}$). At step 920, the error amplifying signal can be compensated with a ramp compensation signal (e.g., $V_{ramp}$) having a predetermined frequency.

At step 930, a state signal (e.g., $V_{st}$) can be generated by comparing the error amplifying signal (e.g., obtained by ramp compensation) against a voltage ripple signal (e.g., $V_{rip}$). For example, the voltage ripple signal may change along with an inductor current (e.g., $i_L$) of the switch-type converter (e.g., 20). At step 940, control signals (e.g., Q1 and Q2) can be generated according to the state signal, in order to control the switch-type converter. For example, 940 can include generating control signals according to the state signal and a clock signal (e.g., CLK) with a predetermined frequency, and the control signals can be switched from a first state to a second state according to the state signal, and from the second state to the first state according to the clock signal.

For example, 940 can include setting the control signals in the first state when the state signal is at a first level, and setting the control signals in the second state when the state signal is at a second level. In this example, the voltage ripple that changes along with the inductor current the switch-type converter may be taken as a reference in order to achieve fixed frequency control. In this way, the control precision of the switch-type converter can be improved, and high frequency control may be obtained.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit configured to control a switch-type converter, the control circuit comprising:
   a) a state detect circuit configured to generate an error amplifying signal according to a feedback voltage and a reference voltage, to compensate said error amplifying signal by a ramp compensation signal having a predetermined frequency, and to generate a state signal by comparing said compensated error amplifying signal against a voltage ripple signal, wherein said voltage ripple signal changes along with an inductor current of said switch-type converter; and
   b) a control signal generator configured to generate control signals to control said switch-type converter according to said state signal.

2. The control circuit of claim 1, wherein said control signal generator is configured to:
   a) generate said control signals according to said state signal and a clock signal having a predetermined frequency; and
   b) switch said control signals from a first state to a second state according to said state signal, and switch said control signals from said second state to said first state according to said clock signal.

3. The control circuit of claim 2, wherein said state detect circuit comprises:
   a) an error amplifier configured to generate an error amplifying signal according to said feedback voltage and said reference voltage;
   b) an adder configured to compensate said error amplifying signal with said ramp compensation signal; and
   c) a comparator configured to generate said state signal by comparing said compensated error amplifying signal against said voltage ripple.

4. The control circuit of claim 3, wherein said control circuit further comprises a voltage ripple generator configured to generate said voltage ripple signal by adding said feedback voltage with a ripple signal, wherein said voltage ripple signal changes along with said inductor current of said switch-type converter.

5. The control circuit of claim 4, wherein said voltage ripple generator comprises a controlled voltage source coupled between said feedback voltage input terminal and an input terminal of said comparator, and wherein a voltage of said controlled voltage source changes along with said inductor current of said switch-type converter.

6. The control circuit of claim 2, wherein said control circuit further comprises:
   a) a clock signal generator comprising a current source, a charge capacitor, a discharge switch, and a comparator, wherein said current source, said charge capacitor, and said discharge switch are coupled in parallel between a non-inverting input terminal of said comparator and ground;
   b) said comparator having an inverting input terminal configured to receive a threshold voltage, and an output terminal configured to provide said clock signal, wherein said discharge switch is controlled by said clock signal; and
   c) a ramp compensation signal generator configured to receive a voltage across said charge capacitor, and to generate said ramp compensation signal.

7. The control circuit of claim 2, wherein said control signal generator comprises:
   a) an RS flip-flop having a reset terminal configured to receive said state signal, a set terminal configured to receive said clock signal, and an output terminal configured to generate a pulse-width modulation (PWM) signal; and
   b) a driving circuit configured to receive said PWM signal, and to generate said control signals.

8. The control circuit of claim 1, wherein said control signal generator is configured to set said control signals at a first state when said state signal is at a first level, and to set said control signals at a second state when said state signal is at a second level.

9. The control circuit of claim 8, wherein said state detect circuit comprises:
   a) an error amplifier configured to generate said error amplifying signal according to said feedback voltage and said reference voltage;
   b) an adder configured to compensate said error amplifying signal with a ramp compensation signal; and
   c) a comparator configured to generate said state signal by comparing said compensated error amplifying signal against said voltage ripple signal.

10. The control circuit of claim 8, wherein said control circuit further comprises a voltage ripple generator configured to generate said voltage ripple by adding said feedback voltage with said voltage ripple signal, wherein said voltage ripple signal changes along with said inductor current of said switch-type converter.

11. The control circuit of claim 10, wherein said voltage ripple generator comprises a controlled voltage source coupled between said feedback voltage and an input terminal of said comparator, and wherein a voltage of said controlled voltage source changes along with said inductor current of said switch-type converter.

12. A switching power supply, comprising said control circuit of claim 1, wherein said switch-type converter comprises first and second power transistors controllable by said control signals.

13. A method of controlling a switch-type converter, the method comprising:
   a) generating an error amplifying signal according to a feedback voltage and a reference voltage;
   b) compensating said error amplifying signal by a ramp compensation signal having a predetermined frequency;
   c) generating a state signal by comparing said compensated error amplifying signal against a voltage ripple signal, wherein said voltage ripple signal changes along with an inductor current of said switch-type converter; and
   d) generating control signals for controlling said switch-type converter according to said state signal.

14. The method of claim 13, wherein said generating control signals comprises:
   a) switching control signals from a first state to a second state according to said state signal; and
   b) switching control signals from said second state to said first state according to a clock signal having a predetermined frequency.

15. The method of claim 13, wherein said generating control signals comprises:
   a) setting said control signals in a first state when said state signal is at a first level; and
   b) setting said control signals in a second state when said state signal is at a second level.

* * * * *